(12) United States Patent
Ridling (10) Patent No.: US 6,983,883 B2
(45) Date of Patent: Jan. 10, 2006

(54) SYSTEM AND METHOD FOR WEIGHING AND TRACKING FREIGHT

(75) Inventor: David J. Ridling, Salisbury, NC (US)

(73) Assignee: Speed Trac Technologies, Inc., Matthews, NC (US)

( * ) Notice: Subject to any disclaimer, the term of this patent is extended or adjusted under 35 U.S.C. 154(b) by 231 days.

(21) Appl. No.: 10/425,203

(22) Filed: Apr. 28, 2003

(65) Prior Publication Data

US 2003/0217870 A1 Nov. 27, 2003

Related U.S. Application Data

(60) Provisional application No. 60/376,248, filed on Apr. 29, 2002.

(51) Int. Cl.
*G06F 17/60* (2006.01)
*G01G 19/413* (2006.01)
*G08B 13/14* (2006.01)

(52) U.S. Cl. .................. 235/385; 177/136; 705/28; 705/407; 705/414; 705/416; 701/50; 702/174

(58) Field of Classification Search ............. 235/385; 705/28, 407, 414–416; 177/136–141; 701/50; 702/174
See application file for complete search history.

(56) References Cited

U.S. PATENT DOCUMENTS

| 4,180,204 A | * | 12/1979 | Koenig et al. ............ 235/385 |
| 4,420,053 A | | 12/1983 | Russo ....................... 177/139 |
| 4,421,186 A | | 12/1983 | Bradley ..................... 177/139 |
| 4,605,081 A | * | 8/1986 | Helmly et al. .......... 177/25.13 |
| 4,638,876 A | | 1/1987 | Balduin et al. ............ 177/139 |
| 4,666,004 A | | 5/1987 | Raz ............................ 177/139 |
| 4,832,204 A | * | 5/1989 | Handy et al. ............... 209/3.3 |
| 4,899,840 A | | 2/1990 | Boubille ..................... 177/139 |
| 5,119,894 A | * | 6/1992 | Crawford et al. .......... 177/145 |
| 5,220,968 A | | 6/1993 | Weber ..................... 177/25.14 |
| 5,230,393 A | * | 7/1993 | Mezey ....................... 177/139 |
| 5,245,137 A | | 9/1993 | Bowman et al. ........... 177/139 |
| 5,401,915 A | | 3/1995 | Schafer ..................... 177/139 |
| 5,650,930 A | * | 7/1997 | Hagenbuch .................. 701/50 |
| 5,780,782 A | * | 7/1998 | O'Dea ....................... 177/136 |
| 5,805,807 A | * | 9/1998 | Hanson et al. ............. 370/340 |
| 5,814,771 A | * | 9/1998 | Oakes et al. ............... 177/136 |
| 5,837,945 A | | 11/1998 | Cornwell et al. .......... 177/136 |
| 5,861,580 A | | 1/1999 | Moore et al. .............. 177/136 |
| 5,917,159 A | | 6/1999 | Kostiuk ..................... 177/136 |
| 6,669,089 B2 | * | 12/2003 | Cybulski et al. ........... 235/385 |
| 2003/0130913 A1 | * | 7/2003 | Ehrman et al. .............. 705/28 |
| 2005/0140511 A1 | * | 6/2005 | Bonnell et al. | |

* cited by examiner

*Primary Examiner*—Randy W. Gibson
(74) *Attorney, Agent, or Firm*—Alston & Bird LLP (57) ABSTRACT

In a freight shipment system and method, the lift trucks used by the freight carrier for handling and loading freight shipments are equipped with a weighing device capable of weighing each piece of freight handled by the lift truck. The lift truck is also equipped with a scanner for scanning coded identifying information associated with each piece of freight. As each piece of freight is handled by the lift truck, the coded identifying information for that piece of freight is captured along with the weight of the load. This information is transmitted to a computer system where it can be used for real-time invoicing. The system can also use the captured information to perform additional automated functions, such as tracking of shipments, freight loss control, and assisting in avoiding overloaded trucks. The same system can monitor maintenance information for the lift trucks so as to provide timely preventive maintenance, and can also provide the human resources information, such as the lift truck driver identification and amount of time worked.

36 Claims, 3 Drawing Sheets

SYSTEM AND METHOD FOR WEIGHING AND TRACKING FREIGHT

CROSS-REFERENCE TO RELATED APPLICATIONS

This application is related to and claims priority from U.S. provisional application Ser. No. 60/376,248 filed Apr. 29, 2002.

FIELD OF THE INVENTION

This invention relates to a system and method that is useful in the freight shipment industry.

BACKGROUND OF THE INVENTION

Typically, in the freight shipment industry, shipments of freight are received from a shipper by the freight carrier, accumulated at freight terminals where they are sorted by shipment destination and then loaded onto tractor-trailer trucks for shipment. At a receiving terminal, the shipments of freight are unloaded, and sorted for trans-shipment or delivery. Usually, the freight shipment is arranged on one or more pallets, and the loading and unloading is handled by lift trucks. Each shipment of freight is assigned an identifying number, and this number is used for tracking the freight from its origin to its destination.

Shipping charges are based upon the weight and the classification of the freight shipment and its weight. Typically, the weight of the shipment is provided to the freight carrier by the shipper on a bill of lading, and the shipment charges are calculated based upon the stated weight provided by the shipper. The freight carrier may conduct spot checks by reweighing selected shipments, but in most instances, the stated weight provided by the shipper is used as the basis for the freight charge, since it has not been feasible to reweigh each piece of freight handled by the freight carrier.

SUMMARY OF THE INVENTION

The present invention is based upon the recognition that in many instances, the shipment weight provided by the shipper is understated, which can result in a significant loss of revenue to the freight carrier. The present invention provides a system and method that makes it possible to achieve real-time weighing of each freight shipment, and real-time invoicing based upon the actual weight of the shipment. The real-time invoicing provides enhanced timeliness and labor savings, and the ability to capture the actual weight of each freight shipment makes it possible to recover significant revenue that would otherwise be lost due to understated shipment weights provided by the shipper.

According to the present invention, the lift trucks used by the freight carrier for handling and loading freight shipments are equipped with a weighing device capable of weighing each piece of freight handled by the lift truck. The lift truck is also equipped with a scanner for scanning coded identifying information associated with each piece of freight. As each piece of freight is handled by the lift truck, the coded identifying information for that piece of freight is captured along with the weight of the load. This information is transmitted to a computer system where it can be used for real-time invoicing. The system of the present invention can also use the captured information to perform additional automated functions, such as tracking of shipments, freight loss control, and assisting in avoiding overloaded trucks. The same system can monitor maintenance information for the lift trucks so as to provide timely preventive maintenance, and can also provide the human resources information, such as the lift truck driver identification and amount of time worked.

BRIEF DESCRIPTION OF THE DRAWINGS

Some of the features and advantages of the invention having been described, others will become apparent from the detailed description which follows, and from the accompanying drawings, in which.

DETAILED DESCRIPTION OF ILLUSTRATIVE EMBODIMENT

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
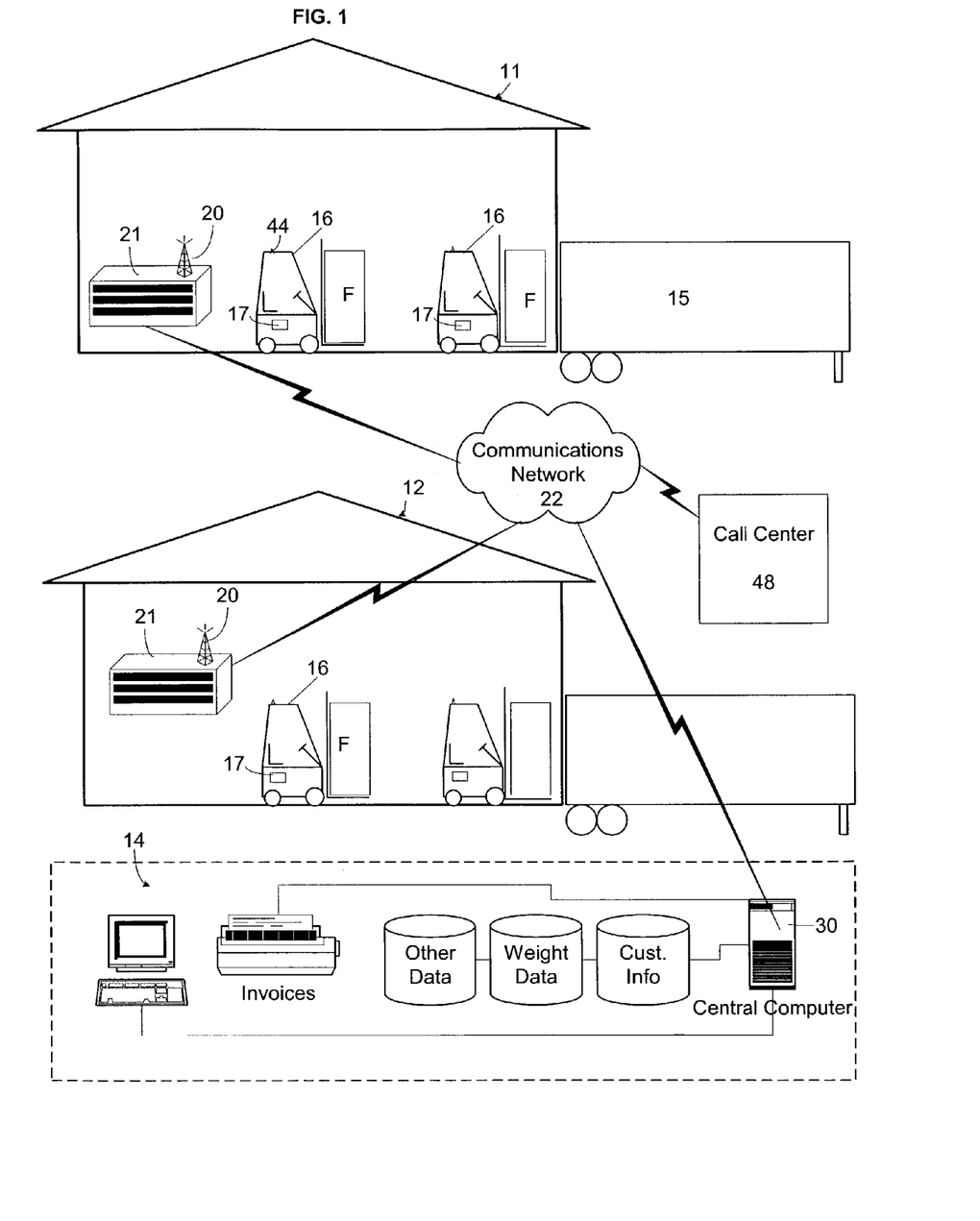
FIG. 1 is a schematic illustration of the system and method of weighing and tracking freight in accordance with the present invention.

FIG. 1 is a schematic illustration of the system and method for weighing and tracking freight in accordance with the present invention. In FIG. 1 two freight terminals are shown, a first freight terminal 11, which may be located in one city, and a second freight terminal 12, which may be located in a distant city. While only two freight terminals are shown for simplicity, it will be understood that a typical freight distribution system will include many freight terminals at various different cities. The freight distribution system also includes a central office, indicated at 14, where certain business operations of the freight carrier are performed.

At each freight terminal a number of trailers 15 are arranged at a loading dock for receiving or unloading freight F. The freight is handled by lift trucks 16. In the embodiment shown, the lift trucks are conventional forklifts which are equipped with a weighing device that is capable of obtaining the weight of each piece of freight handled by the forklift. The weighing device may comprise a load cell mounted to one of the forks of the forklift. Suitable load cells is for this purpose are commercially available from various sources. The load cell is capable of determining the weight of a piece of freight when the lift truck lifts the piece of freight from the ground. The load cell is of such accuracy that it can function as a "legal for trade" weighing device.

Each lift truck is also equipped with a scanner that the operator of the lift truck can use for scanning coded identifying information associated with a piece of freight. The scanner can be a conventional commercially available bar code scanner. The scanner will read coded identifying information in the form of a bar code when the scanner is pointed at the bar code and activated, such as pressing a switch or pulling a trigger. In the embodiment shown, each lift truck is also equipped with a remote computer 17 and with a wireless transmitter (not shown), which may be incorporated into the housing of the computer 17, and which is connected to an antenna 44. The remote computer 17 receives weight information for a piece of freight from the weighing device and the coded identification information for that piece of freight from the scanner. This information is then transmitted by the transmitter to a receiver 20 associated with a base computer 21 located in the freight terminal. Each base computer 21 is connected via a suitable communications network 22 to a central computer 30 located at the central office 14.

Figure 2:
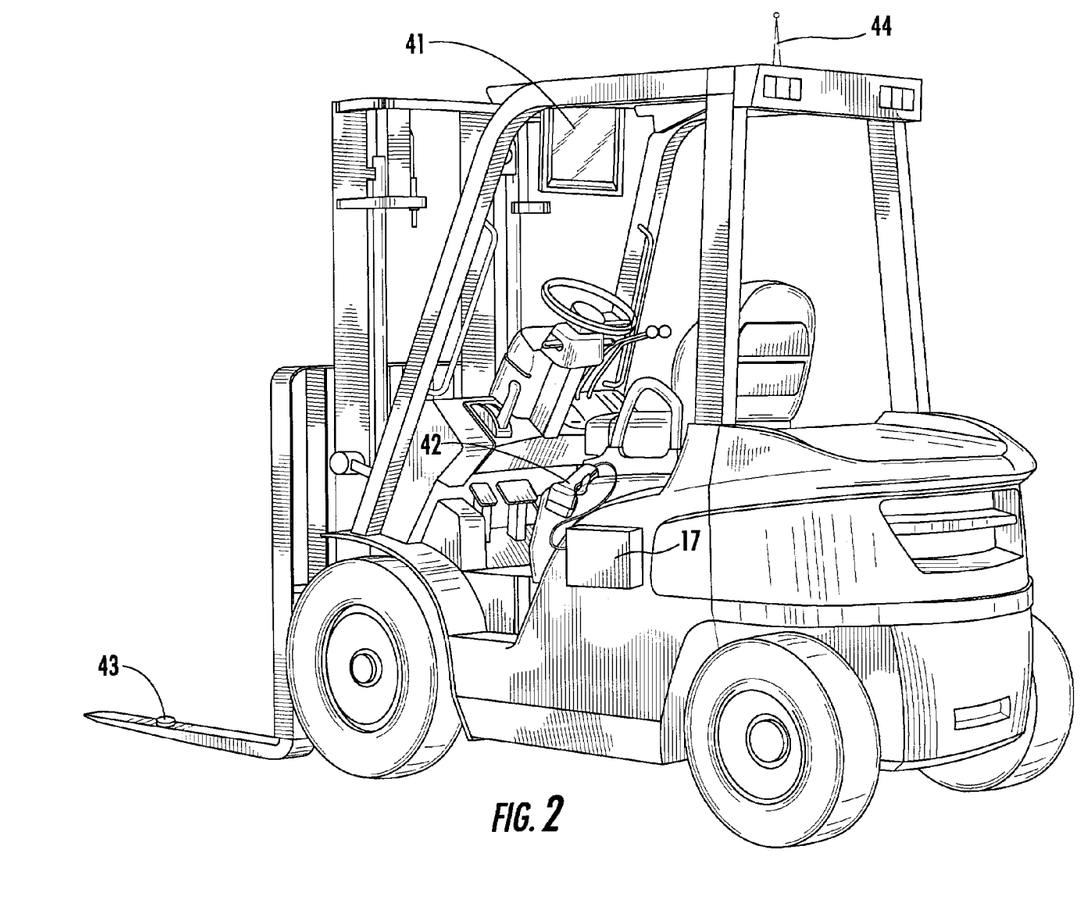
FIG. 2 is a perspective view showing a lift truck equipped for weighing and tracking freight in accordance with the present invention.

FIG. 2 illustrates one way in which the lift truck can be equipped for implementing the system and method of the present invention. In this embodiment, the remote computer 17 is mounted to the lift truck adjacent to the operator's seat. The computer 17 is equipped with a display device 41, such as a LCD display, conveniently located for displaying information to the operator of the lift truck. In the embodiment shown in FIG. 2, the display device is mounted to the roof cage of the lift truck directly in front of the lift truck driver. The display device 41 can also function as an input device for receiving commands from the lift truck operator. For example, the display device 41 can be a touch-screen device, or it can be equipped with suitable keys or buttons, such as "soft keys" that have changeable identification labels that are shown on the display device. A handheld bar code scanner 42 is connected to the computer 17 and is positioned so as to be readily accessible to the lift truck operator. A load cell 43 mounted on the fork of the lift truck is also communicatively connected to the computer 17 by wires (not shown). An antenna 44 is mounted to the roof of the lift truck and is connected to the transmitter, which is housed with the computer 17. It should be understood that this illustrated embodiment represents only one of many ways that the system and method of the present invention can be implemented. For example, in one alternative embodiment, the computer, display device, input device, transmitter, antenna, and scanner are integrated into a single handheld unit, and information from the load cell can be communicated to this handheld unit either by cable or by a wireless connection, such as a Bluetooth link. Alternatively, instead of transmitting information from the computer 17 to the base computer 20 by a wireless connection, the information can simply be stored in a data storage device of the remote computer 17 and periodically downloaded to the base computer 21 by a physical connection, such as a cable or docking cradle.

The coded identifying information for a piece of freight can either be affixed directly to the piece of freight, or it can be provided on a document that is associated with the piece of freight. If it is affixed to the piece of freight, the lift truck operator will simply aim the scanner at a bar code on the piece of freight to read the coded information. It is conventional in the freight shipment industry to create a movement document that follows the freight shipment from its origin to its destination. This movement document includes the identification of the shipper, the consignee name and address, the number of pieces in the shipment, and a description of the shipment. It also has a unique freight bill number (often referred to in the industry as a "pro number") for that shipment, and a corresponding bar code. If the movement document is used as the source of identifying information for the piece of freight, the lift truck operator will simply use the scanner to scan the identifying information from the bar code on the movement document.

When a shipment of freight is received from a shipper, the system and method of the present invention is used to capture the actual weight of each piece of freight in the shipment. For example, as each piece of freight is handled by the lift truck at the origin terminal, the lift truck operator scans the identifying information for that piece of freight and the weight of the piece of freight is determined by the weighing device. This information is transmitted to the base computer 21 and stored. The information can also be made available to the central computer 30 in the central office 14. In one specific embodiment of the present invention, this information is captured by the driver of the lift truck in a simple "lift-shoot-shoot" sequence. First the driver lifts the piece of freight so that the load cell can obtain the weight of the piece of freight. Then the driver "shoots" the coded identifying information for that piece of freight by aiming the barcode scanner at the bar code provided on the movement document for that piece of freight. Finally, the driver "shoots" another predetermined barcode in order to signify to the system that the weighing and reading sequence has been completed. This other predetermined barcode can be located at any suitable location on the lift truck, such as, for example, on the display device located in front of the lift truck driver. The reading of this barcode functions as a signal to the system to close the file and to transmit the information to the base computer 21. Each transmission to the base computer includes the following information: coded identifying information read from the movement document, total freight weight read by the load cell, forklift number, forklift operator identification, date and time, and location of the freight terminal where the information was obtained.

When the freight shipment is unloaded at the destination terminal, a similar "lift-shoot-shoot" procedure is followed to capture the identifying information and actual weight of each piece of freight handled at the terminal. By comparing the actual weight of a shipment at the origin terminal to the weight of the shipment at the destination terminal, a loss control module can rapidly determine whether the shipment arrived intact, or whether there was any loss or pilfering. This information can also be utilized by a tracking module to provide information on the status and location of the shipment.

The system can also include a loading module to facilitate loading a trailer with freight. The loading module includes means for receiving information identifying the trailer into which the lift truck loads the piece of freight, and means for associating this trailer identifying information with a maximum load limit for that trailer. Each time a lift truck delivers a piece of freight to that trailer, the accumulated load weight for that trailer is determined by adding the weight of that piece of freight to the weight of all previously loaded pieces of freight. When the accumulated load weight reaches a predetermined level, in relation to the maximum load limit, a signal is generated that can be used to display information to the operator of the lift truck concerning the progress of loading, or alert the operator that the maximum load limit has been reached. The information identifying the trailer into which the piece of freight is loaded can be received in any of several ways. For example, the lift truck operator can use the scanner to scan a trailer identifying bar code located at the entrance to the trailer where the piece of freight is to be loaded. Alternatively, the trailer identification may be pre-assigned to a piece of freight and indicated on the movement document to inform the lift truck operator where to load the piece of freight. In this case, the scanning of the movement document will serve not only to identify the piece of freight, but also the trailer into which the piece of freight is to be loaded. Alternatively, the trailer identification can be entered manually by the operator of the lift truck using the input device associated with the computer 17, such as a touch screen, keyboard or pen.

The system can further include a maintenance module to assist in monitoring maintenance of the lift trucks. The remote computer 17 on each lift truck can receive status information from the lift truck such as, for example, the number of hours of operation, or any status messages generated by sensors on the lift truck or by a engine control computer module for the lift truck. This information can be used by the central computer 30 for scheduling routine preventive maintenance of the lift trucks or for dispatching a service call.

The system can also include a human resources module for collecting and monitoring information for use by the human resources department of the freight carrier. The human resources module may, for example, require the lift truck operator to log in each time he begins operating the lift truck. In this way, the system can track information about which driver handled each piece of freight in a shipment, driver operating time on the lift truck, number of freight pieces handled, or other information. The collected information can be transmitted to the central computer for use in generating payroll information, work assignments, or for historical purposes.

The system can also include a customer service module which will allow customer service representatives to view the real-time data about freight shipments and to thus provide customers with status and location information about shipments. The customer service representatives can be located at a call center 48 and may access the information via the communications network 22.

The system and method of the present invention is designed to be integrated into the existing freight tracking and invoicing infrastructure of a freight carrier, and supplements the carrier's existing computerized invoicing software. The following description of a typical freight carrier's freight tracking and invoicing functions should provide contextual understanding of how the present invention is implemented and used.

A freight shipment cycle begins when a call from a shipper requesting a freight pickup is received by the freight carrier. The freight carrier will assign a shipment number (pro number) to this shipment, and will instruct a truck driver to pick up the shipment. Typically, the following minimum information is obtained: consignee name and address, stated weight of the shipment and payment information. This information may be provided by telephone, or more typically on a bill of lading prepared by the shipper and given to the truck driver for the freight carrier. Upon receipt of this information, the freight carrier assigns a shipment number (pro number) for this particular shipment. The shipment number may, for example, be attached as a sticker to the bill of lading furnished by the shipper, in which case this bill of lading will function as the movement document. The shipment number may also be represented by a computer readable bar code. Typically, the truck driver will add information to the movement document, such as number of pieces (shipping units) and a description of the shipment, if not already provided.

Upon returning to the freight terminal with the shipments, a data entry clerk updates the freight carrier's computer system with information about the collected shipments, including the information, if any, manually added by the driver, such as number of pieces in the shipment. A further movement document may be generated with this updated information, to be used either in addition to (e.g. stapled to the original bill of lading) or in lieu of the bill of lading furnished by the shipper. The movement document will follow the shipment until its destination.

At this point, the freight carrier's accounting system has all the information needed to generate an invoice for the shipment. The conventional system will generate an invoice at a suitable time using, as a basis for the shipping charges, the stated weight provided by the shipper. The present invention integrates with the existing accounting and invoicing system and provides the capability to update the data record for each shipment or pro number with a real-time actual weight for the shipment. The invoicing module in the central computer uses the thus-captured identifying information and real-time actual weight data to generate customer invoices. The invoices are based upon the actual weight for each piece of freight shipped, rather than an estimate of the shipment weight. The freight carrier's standard accounting software can utilize the information to generate the customer invoices using customer information stored in a database.

Information maintained by the system of the present invention can be made available to authorized users through conventional hard-wired networks, wireless networks, virtual private networks, through web access, or other suitable networking methods.

Figure 3:
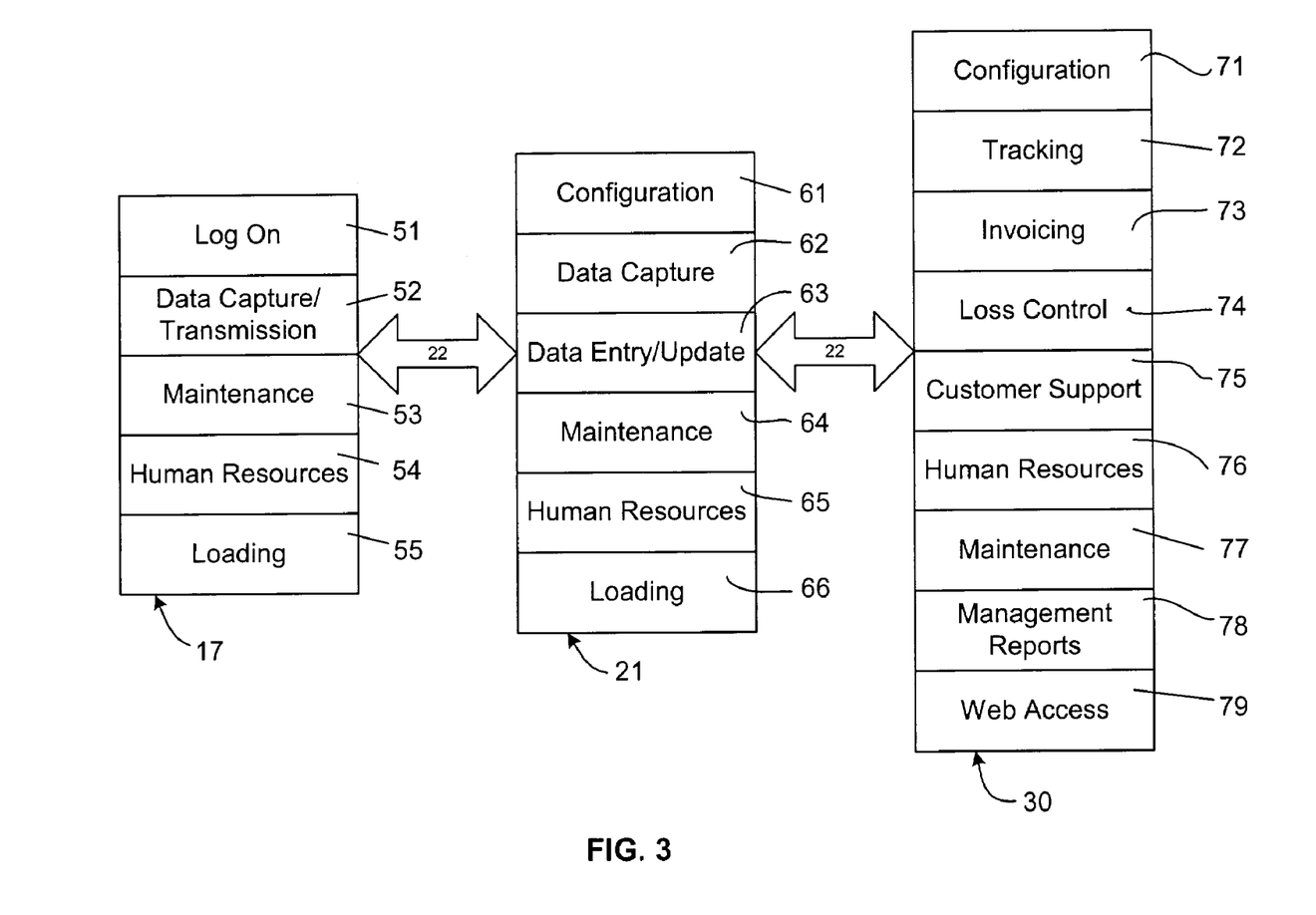
FIG. 3 is a schematic representation showing the functions of the software modules present in the various computers used in the system and method of the present invention.

FIG. 3 illustrates one possible configuration for the software modules that facilitate implementation of the system and method of the present invention. It will be understood by those familiar with computer software that various other implementations are possible and within the scope of the present invention. In this embodiment, software modules are resident in the remote computer 17 that is located on the lift truck, in the base computer 21 at the freight terminal, and in the central computer 30 at the central business office of the freight carrier. These modules process, receive and share information as needed to carry out their assigned tasks or functions.

In the remote computer 17, a log on module 51 captures the lift truck operator identification at the beginning of a shift, as well as the time and date of log in and log out. It additionally may capture the number of lifts made by the operator. The data capture and transmission module 52 captures the identifying information for a shipment from the scanner and the weight of the shipment from the load cell, and controls transmission of this information to the base computer 21. The maintenance module 53 maintains pertinent maintenance information such as total running time, number of lifts, etc. and passes this information to the base computer 21. The human resources module 54 coordinates sending pertinent information about the lift truck operator to the base computer 21, such as the log in and log out times and dates. The loading module 55 facilitates receiving information about which trailer a shipment is loaded into, and displaying information to the lift truck operator about the status of loading that trailer, such as cumulative weight loaded onto the trailer or whether the maximum weight limit for that trailer is being approached or has been exceeded.

At the base computer 21, a configuration module 61 controls the basic configuration and "housekeeping" functions of system. A data capture module 62 receives and stores the data transmitted from the lift trucks 16 in the terminal. A data entry and update module 63 allows for entry and updating of information by a data entry clerk. A maintenance module 64 receives and administers the maintenance information from the maintenance modules 53 of the respective lift trucks. Likewise, the human resources module 65 receives and administers human resources information from the human resource modules 54 of the respective lift trucks. A loading module 66 interfaces with the loading modules 55 on the respective lift trucks.

At the central computer 30, a configuration module 71 controls the basic configuration and "housekeeping" functions of the system. A tracking module 72 utilizes the time and date stamp data and location data that is generated by a lift truck each time a shipment is handled to trace the progress of the shipment and its current location. An invoicing module 73 makes available to the freight carrier's standard invoicing software, the actual weight of each shipment. A loss control module 74 compares the actual weight of a shipment at one location (e.g. its origin) with the actual weight of the same shipment at another location (e.g. its destination) to identify if there is any variance. A customer support module 75 gives a customer support representative access to pertinent information, such as tracking information, invoicing information, etc. A human resources module 76 coordinates the information obtained by the human resource modules 54 and 65, and a maintenance module 77 coordinates the information from the maintenance modules 53, 64. A management reports module 78 has access to all of the accumulated data obtained by the system and is capable of displaying or printing various kinds of management information. A web access module 79 provides for uploading selected subsets of the data stored on the central computer to a web host to allow for remote web access by authorized users. The various functions such as customer support, human resources and maintenance may, if desired, be accessed remotely via web access rather than through a direct network connection.

Table 1 below shows the fields of information that are maintained in the system, and the fields that are used by the various modules.

TABLE 1

| Module | Pro Number | Location | Date | Time | Operator ID | Forklift Number | Number Pieces | Stated Weight | Actual Weight | Variance | Key On Time | Key off Time | Lifts by Operator |
|---|---|---|---|---|---|---|---|---|---|---|---|---|---|
| Data Capture/ Transmission | x | x | x | x | x | x | | | x | | | | |
| Data Entry/ Update | x | | x | | | | | x | x | | | | |
| Invoicing | x | x | x | x | x | x | x | x | x | x | | | |
| Maintenance | | x | x | x | x | x | | | | | x | x | x |
| Loss Recovery | x | x | x | x | x | | x | x | x | x | | | |
| Human Resources | | x | x | x | x | x | x | | | | | | x |
| Management View | x | x | x | x | x | x | x | x | x | x | x | x | x |

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed is:

1. A system for weighing and tracking freight comprising:
   a lift truck equipped for lifting and moving a piece of freight;
   a weighing device associated with the lift truck for obtaining the weight of the piece of freight;
   a scanner accessible to an operator of the lift truck for scanning coded identifying information associated with the piece of freight;
   a wireless transmitter communicatively connected to the weighing device and to the scanner and operable for transmitting weight data and identifying information obtained for the piece of freight to a receiving site;
   a receiver at the receiving site communicatively connected to said transmitter and operable for receiving the weight data and identifying information transmitted by said transmitter;
   a base computer communicatively connected to said receiver for receiving the weight data and identifying information; and
   a database associated with said base computer for receiving and storing the weight data and identifying information for the freight.

2. The system of claim 1, wherein said weighing device is a load cell mounted to the lift truck for sensing the weight of the piece of freight.

3. The system of claim 1, wherein the lift truck is a fork lift truck having forks for lifting the piece of freight, and wherein said weighing device is a load cell mounted to at least one of the forks of the lift truck.

4. The system of claim 1, additionally including a movement document for each freight shipment that is handled by the system, the movement document being intended to follow the freight shipment as it is transported by a freight carrier, and said movement document including a printed description of the freight shipment, the number of freight pieces, and coded identifying information that can be read by said scanner.

5. The system of claim 1, including at least one additional lift truck equipped for lifting and moving a piece of freight, said at least one additional lift truck also including a weighing device to obtain the weight from a piece of freight, a scanner to scan coded identifying information associated with the piece of freight, and a wireless transmitter communicating with said transmitter for transmitting weight data and identifying information obtained for the piece of freight to said receiving site.

6. The system of claim 1, wherein said base computer is located in the general proximity of the lift truck, and additionally including a central computer at another location communicatively connected to said base computer for accessing said weight data and identifying information.

7. The system of claim 1, including an invoicing module operable for generating customer invoices based upon the weight data and identifying information obtained by said lift truck.

8. The system of claim 1, including a remote computing unit provided on the lift truck and communicatively connected to said weighing device, said scanner, and said wireless transmitter, said remote computing unit including a data storage unit for storing weight data and identifying information for pieces of freight handled by the lift truck.

9. The system of claim 8, wherein said remote computing unit includes an output display device for displaying information to the operator of the lift truck.

10. The system of claim 9, including a loading module including means for receiving trailer identifying information obtained by said scanner as the lift truck approaches or enters a trailer delivering a piece of freight, means for associating said trailer identifying information with a maximum load limit for that trailer, means for generating an accumulated load weight for that trailer each time the lift truck delivers a piece of freight to that trailer, and means for comparing the maximum load limit with the accumulated load weight and for displaying information to the operator of the lift truck concerning the progress of loading via said output device.

11. The system of claim 8, including a maintenance module, said maintenance module including means in said remote computing unit operable for receiving lift truck status information from said lift truck and for transmitting said information via said transmitter, and means associated with said base computer for receiving said lift truck status information.

12. The system of claim 8, including a human resources module, said human resources module including means in said remote computing unit operable for receiving driver identification information from the driver of said lift truck and for transmitting said information via said transmitter, means for tracking driver operating time on the lift truck, and means associated with said base computer for receiving said driver identification information and said driver operating time.

13. The system of claim 1, including a tracking module operable for generating real-time location information about the location of the piece of freight and for transmitting said location information to said base computer.

14. The system of claim 1, wherein said lift truck, said receiver and said base computer are located in a first freight terminal, and additionally including a second freight terminal at a location distant from said first freight terminal, said second freight terminal also including a lift truck equipped for lifting and moving a piece of freight, a weighing device associated with the lift truck for obtaining the weight the piece of freight, a scanner provided on the lift truck for scanning coded identifying information provided on the piece of freight, a wireless transmitter provided on the lift truck and communicatively connected to the weighing device and to the scanner and operable for transmitting weight data and identifying information obtained for the piece of freight to a receiving site at the second terminal, a receiver at the receiving site communicatively connected to said transmitter and operable for receiving the weight data and identifying information transmitted by said transmitter, a second terminal base computer communicatively connected to said receiver for receiving the weight data and identifying information, and a communications link connecting said second terminal base computer to said database whereby the database receives and stores the weight data and identifying information for the loads of freight at said second terminal.

15. The system of claim 14, including a loss control module, said loss control module including means for comparing the recorded weight of a piece of freight at said first terminal with the recorded weight of the same piece of freight at said second terminal, and for generating a notification if there is a discrepancy between the recorded weights at the first terminal and at the second terminal.

16. A system for weighing and tracking freight comprising:
  a plurality of lift trucks, each equipped for lifting and moving pieces of freight;
  a weighing device associated with each said lift truck for obtaining the weight of a piece of freight handled by the lift truck;
  a scanner provided on each said lift truck for scanning coded identifying information associated with that piece of freight;
  a wireless transmitter associated with each said lift truck communicatively connected to the weighing device and to the scanner on the said lift truck and operable for transmitting weight data and identifying information obtained for the piece of freight to a receiving site;
  a receiver at the receiving site communicatively connected to each said transmitter and operable for receiving the weight data and identifying information transmitted by each transmitter;
  a base computer communicatively connected to said receiver for receiving the weight data and identifying information;
  a database associated with said computer for receiving and storing the weight data and identifying information; and
  at least one data processing module communicatively connected to said database and operable for generating output information regarding the freight handled by the lift trucks.

17. The system of claim 16, wherein said data processing module comprises an invoicing module, said invoicing module including a customer information file with fields for storing customer information, and means for accessing said database and said customer information file and for generating customer invoices based upon the weight information obtained for the pieces of freight handled by the lift trucks.

18. The system of claim 16, wherein said data processing module comprises a loading module including means for receiving trailer identifying information obtained by said scanner as the lift truck approaches or enters a trailer delivering a piece of freight, means for associating said trailer identifying information with a maximum load limit for that trailer, means for generating an accumulated load weight for that trailer each time the lift truck delivers a piece of freight to that trailer, and means for comparing the maximum load limit with the accumulated load weight and for generating a signal before the maximum load limit for that trailer is exceeded.

19. The system of claim 16, wherein said data processing module includes a maintenance module, said a maintenance module including means for receiving lift truck status information from said lift truck and for transmitting said information via said transmitter, and means associated with said base computer for receiving said lift truck status information.

20. The system of claim 16, wherein said data processing module includes a human resources module, said human resources module including means for receiving driver identification information from the driver of said lift truck, means for tracking driver operating time on the lift truck, and means associated with said base computer for receiving said driver identification information and said driver operating time.

21. The system of claim 16, wherein said data processing module includes a loss control module, said lost control module including a history file containing prior weight data and identifying information for pieces of freight that have been handled at an earlier time; and means for comparing current weight data for a piece of freight obtained by the lift truck with prior weight data in said history file for that same piece of freight and for generating an output if the current weight data differs from the prior weight data by a predetermined amount.

22. A system for weighing and tracking freight comprising:
   a lift truck equipped for lifting and moving a piece of freight;
   a weighing device associated with the lift truck for obtaining the weight of the piece of freight;
   a scanner accessible to an operator of the lift truck for scanning coded identifying information associated with the piece of freight;
   a movement document for each freight shipment that is handled by the system, the movement document being intended to follow the freight shipment as it is transported by a freight carrier, and said movement document including coded identifying information that can be read by said scanner;
   a base computer communicating with said weighing device for receiving weight data for a piece of freight and communicating with said scanner for receiving identifying information obtained for the piece of freight;
   a database associated with said base computer for receiving and storing the weight data and identifying information for the freight; and
   an invoice generator communicating with said database for generating customer invoices based upon the thus-obtained weight data and identifying information.

23. A method for weighing and tracking freight comprising:
   equipping a lift truck with a weighing device capable of obtaining the weight of each piece of freight handled by the lift truck;
   scanning coded identifying information associated with a piece of freight in connection with the handling of the piece of freight by the lift truck;
   obtaining the weight data for the piece of freight handled by the lift truck;
   transmitting to a receiving site the weight data obtained by the weighing device and the identifying information obtained by the scanner;
   receiving at the receiving site the transmitted weight data and identifying information;
   storing the thus obtained weight data and identifying information for the piece of freight; and
   equipping at least one additional lift truck with a weighing device to obtain the weight from a piece of freight, a scanner to scan coded identifying information associated with the piece of freight, and a wireless transmitter for transmitting weight data and identifying information obtained for the piece of freight to the receiving site.

24. The method of claim 23, wherein said step of obtaining weight data comprises lifting the piece of freight by the lift truck and capturing weight data produced by the weighing device.

25. The method of claim 23, wherein said scanning step is performed by the operator of the lift truck in connection with handling a piece of freight.

26. A method for weighing and tracking freight comprising;
   equipping lift truck with a weighing device capable of obtaining the weight of each piece of freight handled by the lift truck;
   generating a movement document for a freight shipment, the movement document including a printed description of the freight shipment, the number of freight pieces, and coded identifying information that can be read by a scanner;
   scanning the coded identifying information from the movement document in connection with the handling of the piece of freight by the lift truck;
   obtaining the weight data for the piece of freight handled by the lift truck;
   transmitting to a receiving site the weight data obtained by the weighing device and the identifying information obtained by the scanner;
   receiving at the receiving site the transmitted weight data and identifying information; and
   storing the thus obtained weight data and identifying information for the piece of freight.

27. The method of claim 23, including the step of equipping the lift truck with a remote computing unit communicatively connected to the weighing device, to the scanner, and to a wireless transmitter for transmitting weight data and identifying information for pieces of freight handled by the lift truck to the receiving site.

28. The method of claim 27, including the step of storing weight data and identifying information for pieces of freight handled by the lift truck in a memory unit associated with the remote computing unit.

29. The method of claim 27, including displaying via the remote computing unit to the operator of the lift truck information about the pieces of freight handled by the lift truck.

30. A method for weighing and tracking freight comprising:
   equipping a lift truck with a weighing device capable of obtaining the weight of each piece of freight handled by the lift truck;
   scanning coded identifying information associated with a piece of freight in connection with the handling of the piece of freight by the lift truck;
   obtaining the weight data for the piece of freight handled by the lift truck;
   transmitting to a receiving site the weight data obtained by the weighing device and the identifying information obtained by the scanner;
   receiving at the receiving site the transmitted weight data and identifying information;
   storing the thus obtained weight data and identifying information for the piece of freight; and
   reading via the scanner trailer identifying information as the lift truck approaches or enters the trailer to deliver a piece of freight, associating the trailer identifying information with a maximum load limit for that trailer, generating an accumulated load weight for that trailer each time the lift truck delivers a piece of freight to that trailer, comparing the maximum load limit with the accumulated load weight, and generating a signal to the operator of the lift truck when the accumulated loud weight reaches a predetermined value in relation to the maximum load limit for the trailer.

31. The method of claim 23, including generating customer invoices based upon the weight data and identifying information obtained by said lift truck.

32. A method for weighing and tracking freight comprising:
   equipping a lift truck with a weighing device capable of obtaining the weight of each piece of freight handled by the lift truck;
   scanning coded identifying information associated with a piece of freight in connection with the handling of the piece of freight by the lift truck;
   obtaining the weight data for the piece of freight handled by the lift truck;
   transmitting to a receiving site the weight data obtained by the weighing device and the identifying information obtained by the scanner;
   receiving at the receiving site the transmitted weight data and identifying information;
   storing the thus obtained weight data and identifying information far the piece of freight; and
   generating real-time location information about the location of the piece of freight and transmitting said location information to said receiving site.

33. A method for weighing and tracking freight comprising:
   equipping a lift truck at a first freight terminal with a weighing device capable of obtaining the weight of each piece of freight handled by the lift truck;
   scanning coded identifying information associated with a piece of freight in connection with the handling of the piece of freight by the lift truck at the first freight terminal;
   obtaining the weight data for the piece of freight handled by the lift truck at the first freight terminal;
   transmitting to a receiving site the weight data obtained by the weighing device and the identifying information obtained by the scanner;
   receiving at the receiving site the transmitted weight data and identifying information;
   storing the thus obtained weight data and identifying information for the piece of freight;
   transporting freight from the first terminal to a second freight terminal at a location distant from said first freight terminal, said second freight terminal also having a lift truck equipped with a weighing device capable of obtaining the weight of each piece of freight handled by the lift truck,
   scanning coded identifying information associated with a piece of freight in connection with the handling of the piece of freight by the lift track at the second terminal;
   obtaining the weight data for the piece of freight handled by the lift truck at the second terminal;
   transmitting to a receiving site the weight data obtained by the weighing device and the identifying information obtained by the scanner;
   receiving at the receiving site the transmitted weight data and identifying information; and
   storing the thus obtained weight data and identifying information for the piece of freight.

34. The system of claim 33, including the steps of comparing the recorded weight of a piece of freight at said first terminal with the recorded weight of the same piece of freight at said second terminal, and generating a notification if there is a discrepancy between the recorded weights at the first terminal and at the second terminal.

35. A method for weighing and tracking freight comprising:
   equipping a lift truck with a weighing device capable of obtaining the weight of each piece of freight handled by the lift truck;
   generating a movement document for a freight shipment, the movement document including a printed description of the freight shipment, the number of freight pieces, and coded identifying information that can be read by a scanner;
   scanning coded identifying information associated with a piece of freight from the movement document for that piece of freight;
   lifting the piece of freight by the lift truck and obtaining the weight data for the piece of freight from the weighing device;
   transmitting to a receiving site the weight data obtained by the weighing device and the identifying information obtained by the scanner;
   receiving at the receiving site the transmitted weight data and identifying information;
   storing the thus obtained weight data and identifying information for the piece of freight; and
   generating customer invoices based upon the stored weight data and identifying information.

36. The method of claim 35, including generating real-time location information about the location of the piece of freight and transmitting said location information to said receiving site.

* * * * *

UNITED STATES PATENT AND TRADEMARK OFFICE
CERTIFICATE OF CORRECTION

PATENT NO. : 6,983,883 B2
APPLICATION NO. : 10/425203
DATED : January 10, 2006
INVENTOR(S) : Ridling Page 1 of 1

It is certified that error appears in the above-identified patent and that said Letters Patent is hereby corrected as shown below:

Column 13,
Line 2, "loud" should read --load--.

Column 14,
Line 3, "track" should read --truck--.

Signed and Sealed this

Twenty-fourth Day of April, 2007

JON W. DUDAS
*Director of the United States Patent and Trademark Office*

(12) EX PARTE REEXAMINATION CERTIFICATE (7262nd)
United States Patent
Ridling (10) Number: US 6,983,883 C1
(45) Certificate Issued: Dec. 22, 2009

(54) SYSTEM AND METHOD FOR WEIGHING AND TRACKING FREIGHT

(75) Inventor: David J. Ridling, Salisbury, NC (US)

(73) Assignee: Speed Trac Technologies, Inc., Matthews, NC (US)

Reexamination Request:
No. 90/008,179, Aug. 15, 2006

Reexamination Certificate for:
Patent No.: 6,983,883
Issued: Jan. 10, 2006
Appl. No.: 10/425,203
Filed: Apr. 28, 2003

Certificate of Correction issued Apr. 24, 2007.

Related U.S. Application Data
(60) Provisional application No. 60/376,248, filed on Apr. 29, 2002.

(51) Int. Cl.
*G01G 19/413* (2006.01)
*G08B 13/14* (2006.01)

(52) U.S. Cl. .............. 235/385; 177/136; 701/50; 702/174; 705/28; 705/407; 705/414; 705/416

(58) Field of Classification Search .............. None
See application file for complete search history.

(56) References Cited

U.S. PATENT DOCUMENTS

| | | |
|---|---|---|
| 4,225,926 A | 9/1980 | Wendt |
| 4,462,045 A | 7/1984 | Norris |
| 5,072,400 A | 12/1991 | Manduley |
| 5,644,489 A | 7/1997 | Hagenbuch |
| 6,370,222 B1 | 4/2002 | Cornick, Jr. |
| 6,549,891 B1 | 4/2003 | Rauber et al. |
| 6,600,418 B2 | 7/2003 | Francis et al. |
| 7,191,942 B2 | 3/2007 | Aptekar |
| 7,313,549 B2 | 12/2007 | Hudson |
| 2003/0036977 A1 | 2/2003 | Morse |
| 2003/0216970 A1 | 11/2003 | Vadjinia |
| 2004/0193466 A1 | 9/2004 | Kull et al. |
| 2005/0174258 A1 | 8/2005 | Yamanouchi et al. |
| 2006/0261164 A1 | 11/2006 | Bochicchio |

OTHER PUBLICATIONS

"Glossary of Shipping Terms" website, posted Mar. 5, 2001.*
Simulcast product brochure *QTLTSC with SimulCast™* Oct. 1998.
*Reweigh Program Delivers Customer Satisfaction* The Overniter Online 1998.
*Legal–For–Trade Lift Truck Scale Provides Instant and Accurate Weigh Verification* Weigh–Tronix press release Jun. 3, 1999.
Weigh–Tronix Lift Truck Scale for ITA Brochure, Sep. 1999.
*Weight Is Money* Article Modem Materials Handling, v. 55, n 4, p. 83 Apr. 2000.
QTLTSC with Simulcast™ Memorandum Jun. 1997.

* cited by examiner

*Primary Examiner*—Lynne H. Browne (57) ABSTRACT

In a freight shipment system and method, the lift trucks used by the freight carrier for handling and loading freight shipments are equipped with a weighing device capable of weighing each piece of freight handled by the lift truck. The lift truck is also equipped with a scanner for scanning coded identifying information associated with each piece of freight. As each piece of freight is handled by the lift truck, the coded identifying information for that piece of freight is captured along with the weight of the load. This information is transmitted to a computer system where it can be used for real-time invoicing. The system can also use the captured information to perform additional automated functions, such as tracking of shipments, freight loss control, and assisting in avoiding overloaded trucks. The same system can monitor maintenance information for the lift trucks so as to provide timely preventive maintenance, and can also provide the human resources information, such as the lift truck driver identification and amount of time worked.

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 10, 14, 15, 18, 21, 30, 33 and 34 is confirmed.

Claim 1–9, 11–13, 16, 17, 19, 20, 22–29, 31, 32, 35 and 36 are cancelled.

\* \* \* \* \*